(12) United States Patent
Olsen

(10) Patent No.: US 9,100,086 B1
(45) Date of Patent: *Aug. 4, 2015

(54) AIRCRAFT BASESTATION

(75) Inventor: Randall B. Olsen, Carlsbad, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 748 days.

This patent is subject to a terminal disclaimer.

(21) Appl. No.: 13/345,957

(22) Filed: Jan. 9, 2012

Related U.S. Application Data

(63) Continuation-in-part of application No. 12/552,451, filed on Sep. 2, 2009, now Pat. No. 8,116,763.

(51) Int. Cl.
*H04B 7/185* (2006.01)

(52) U.S. Cl.
CPC ........ *H04B 7/18504* (2013.01); *H04B 7/18506* (2013.01)

(58) Field of Classification Search
CPC .......... H04B 7/18506; H04B 7/18508; H04B 7/18504; H04B 7/18502; H04B 7/185; H04B 7/0408; H04B 84/06
USPC ...................... 455/431, 445, 422.1, 436, 11.1
See application file for complete search history.

(56) References Cited

U.S. PATENT DOCUMENTS

| | | | | |
|---|---|---|---|---|
| 6,018,659 A * | 1/2000 | Ayyagari et al. | ............... | 455/431 |
| 6,324,398 B1 * | 11/2001 | Lanzerotti et al. | ............ | 455/431 |
| 6,337,659 B1 * | 1/2002 | Kim | .............................. | 342/373 |
| 8,604,989 B1 * | 12/2013 | Olsen | ........................... | 343/754 |
| 2004/0198346 A1 * | 10/2004 | Swensen et al. | ............... | 455/431 |
| 2004/0219877 A1 * | 11/2004 | Myer et al. | .................... | 455/11.1 |
| 2007/0184810 A1 * | 8/2007 | Knoblach et al. | .......... | 455/343.1 |
| 2009/0098850 A1 * | 4/2009 | Deaton et al. | .............. | 455/404.1 |
| 2010/0087190 A1 * | 4/2010 | Pandit et al. | .................. | 455/431 |

\* cited by examiner

*Primary Examiner* — Ajit Patel
(74) *Attorney, Agent, or Firm* — SPAWAR Systems Center Pacific; Stpehen E. Baldwin; Kyle Eppele

(57) ABSTRACT

A wireless communications basestation that utilizes a light weight high directivity electronically-steerable antenna mounted on an aircraft to providing relay broadband communication service among mobile units in a geographic area is provided. The aircraft carries aloft the antenna; a radio and a switching device for routing. A gateway may also be provided to enable communications with a wide area network. A communication system for a geographic area utilizing the airborne wireless communications basestation is also presented. The system includes a number of user equipment units located in the geographic area in communication with the airborne wireless communications basestation. The user equipment units may utilize omni-directional antennas for low data rate communications, and/or a high directivity antenna.

20 Claims, 5 Drawing Sheets

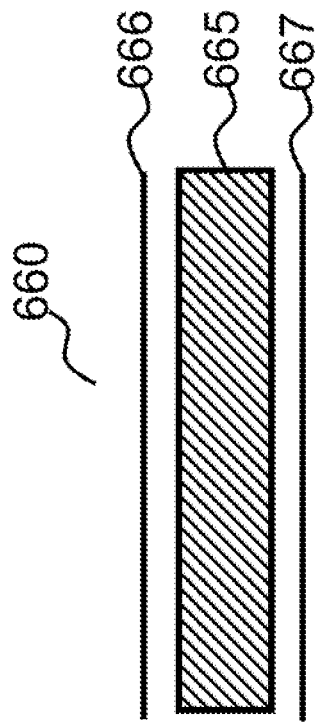
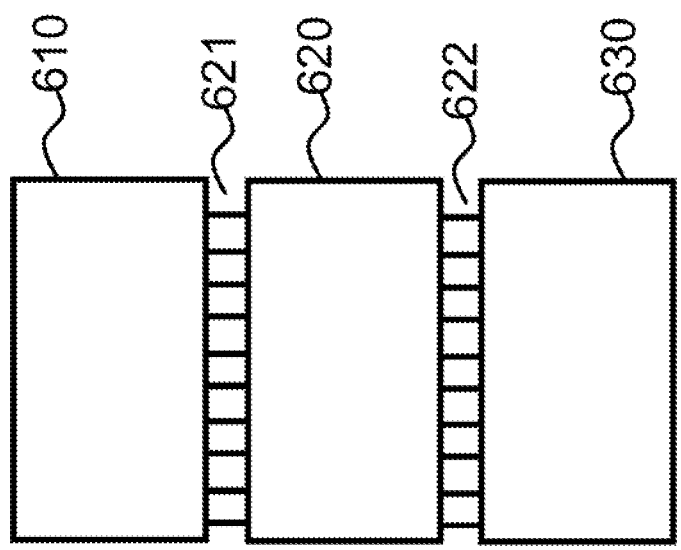
FIG. 4b
FIG. 4a

AIRCRAFT BASESTATION

CROSS-REFERENCE TO RELATED APPLICATION

The present application is a continuation-in-part patent application of patent application Ser. No. 12/552,451, filed Sep. 2, 2009 now U.S. Pat. No. 8,116,763, entitled AIRBORNE BASESTATION (Navy Case No. 098,720-hereinafter "the parent application"), assigned to the same assignee as the present application, the details of which are hereby incorporated by reference. Priority is claimed under 35 USC 120 for all common subject matter. The present application is also related to pending patent application entitled Steerable Antenna, Ser. No. 11/603,707, filed Nov. 22, 2006, the teachings and disclosure of which are hereby incorporated in their entireties by reference thereto.

FEDERALLY-SPONSORED RESEARCH AND DEVELOPMENT

This invention (Navy Case No. 101,542) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-2778; email T2@spawar.navy.mil.

BACKGROUND OF THE INVENTION

This invention relates generally to methods and apparatuses for communicating broadband signals between multiple customers and, more particularly, to methods and apparatuses for communicating using a low-cost, easily maintainable, fast deployable communication system capable of broadband and network communication in various environments.

Wireless data and telephony communication systems are quickly replacing conventional communication systems. Conventional terrestrial wireless telephony relies on unobstructed Line-Of-Sight (LOS) paths or close range multipaths between the sending and receiving stations. This technology is easy to maintain. However, the communication range of operation is limited. The LOS restriction is particularly important for special mobile units, such as off-road vehicles. The local terrain quite often dictates vehicle position relative to the sending and receiving units in order for unobstructed communication to occur. Also, land-based wireless infrastructures are expensive to deploy and maintain, especially in remote areas.

FIG. 1 depicts a schematic diagram of a portion of a typical wireless telecommunications system designated generally as 10. System 10 serves a number of wireless terminals 22 and 24 that are situated within a geographic area. System 10 comprises wireless switching center 12 that is connected to a number of base stations $14_i$ and that is also coupled to local and long distance telephone networks 16. Wireless switching center 12 is responsible for, among other things, routing or "switching" calls from and to wireless terminals or, alternatively, between a wireless terminal and a wireline terminal connected to wireless system 10, via local and/or long distance telephone networks 16.

The geographic area serviced by wireless system 10 is partitioned into a number of spatially distinct areas called cells. As depicted in FIG. 1, each cell $20_i$ is schematically represented by a hexagon. In practice, however, each cell $20_i$ usually has an irregular shape that depends, for example, on the topography of the terrain serviced by system 10. Typically, each cell $20_i$ contains a corresponding base station $14_i$. Base station $14_i$ comprises antennas and radios to communicate with wireless terminals 22 and 24. Each base station $14_i$ also comprises transmission equipment to communicate with wireless switching center 12.

In designing system 10, engineers allocate a limited number of frequency channels to each base station $14_i$ using well known techniques. Base stations $14_i$ communicate with wireless terminals over these frequency channels. Thus, the number of base stations limits the potential capacity of system 10 for processing calls to and from wireless terminals.

Present wireless communication systems fail to provide broadband wireless communication in real time across extended distances while maintaining a LOS path between stations where one or both stations may be in motion. Many regions of the world today have a sparse or no fixed communication infrastructure and lack the resources needed to upgrade their existing equipment to match more developed areas. Wireless communication systems are an effective tool for providing this service. However, present wireless systems fail to meet the needs of specific applications.

A factor impacting traditional wireless communication infrastructures is the huge increase in demand for communicating broadband services consisting of voice, video, and data information. Because of inherent limitations in the transmission media, wireless communication must compensate for noise introduced in the radio path. The following are wireless techniques for compensating for noise: 1) restricting the range; 2) increasing the transmitted signal amplification or power; 3) increasing the received signal amplification; 4) increasing the error correcting efficiency; 5) changing the radio signal modulation or frequency to reduce the impact of noise; or 6) a combination of any or all of these techniques. However, all of these techniques affect the cost and complexity of a wireless system. Moreover, compensating for unreliable wireless paths becomes increasingly difficult as the data rate increases.

Various satellite-based solutions have been proposed to address the above identified issues, but are generally too costly unless applied over continental or larger geographic areas. Low Earth Orbit (LEO) and Medium Earth Orbit (MEO) based systems aspiring to global coverage do so at the expense of operating satellites over the two thirds of the earth covered by water. Additionally, the often huge increase in wireless earth-space-earth path distance between terrestrial stations adversely impacts satellite-based solutions because of the end-to-end transmission delay and increased path loss. Thus, real-time communication is impractical at higher orbital altitudes. This is especially the case with Geosynchronous Earth Orbit (GEO) satellite systems. An optimally-designed three-stage chemical rocket typically must be 94% propellant at launch to reach geosynchronous orbit, which, after allocating about 5.6% of the weight for the rocket, only leaves about 0.4% of the initial launch weight for the satellite. To put this in perspective, a typical 3,000 lb. automobile with the same performance would only be able to carry one 200 lb. person, would need a 8,400 gallon fuel tank, and would be junked after one trip.

The following are other drawbacks or implementation difficulties of GEO satellites: 1) the high cost of launching the satellites into the geostationary orbit; 2) long inter-satellite link distances; and 3) high transmit power requirement. Neither satellite-based or fixed land-based systems easily facilitate transient demands for communication in remote areas. Presently, no communication infrastructure exist for allowing economic operation within a relatively confined geographical area for service that may have fluctuating demand and require rapid deployment of the system.

FIG. 2 shows a known communication system in which the platform supporting base station 314 is a high altitude balloon 326. The high altitude balloon 326 is capable of maintaining altitudes greater than 120,000 feet above sea level for periods of time exceeding several months while supporting a payload.

High altitude balloon 326 is provided with a streamlined body to facilitate horizontal movement while minimizing the effect of winds on balloon 326. Balloon 326 includes propulsion system 332 which may be in the form of propeller 334 driven by an electric motor. A power supply, such as solar cell array 336, is positioned on the balloon envelope to supply energy during daytime to drive propulsion system 332 and to charge batteries 338. Batteries 338 supply energy to propulsion system 332 during nighttime flight. Although balloon 326 is disclosed as having propulsion system 332 including propeller 334 driven by an electric motor, an appropriate propulsion system capable of maintaining balloon 326 in a substantially stationary position over the earth may be used, e.g., jet engine, rocket engine, ion engine, etc.

As shown in FIG. 2, an RF signal transmitted by wireless terminal 322 is received by base station 314 defining the cell from which the RF signal was transmitted. The RF signal is converted from microwave at base station 314 using demodulation techniques and base station 314 communicates via microwave link 340 with wireless switching center 312. The RF signal is converted to microwave via block conversion which allows a single wireless switching center 312 to handle all of the processing for hundreds of base stations. If the signal is directed to another wireless terminal, wireless switching center 312 returns the signal along with routing data to base station 314 via microwave link 340. Thereafter, the signal is routed, according to the routing data, to the appropriate wireless terminal. If the signal is directed to a wireline terminal, wireless switching center 312 will route the call to the appropriate wireline terminal.

Unfortunately, the high altitude balloon 326 is currently very expensive to build and operate and such balloons do not yet have operating experience which proves that they can be reliable enough for economically attractive use.

There are two key challenges for providing a widely attractive airborne basestation that have not previously been overcome in previous systems. The two key challenges are cost and weight for the communications equipment. Prior systems have been both cost prohibitive and impracticably heavy Accordingly, there is a need in the art for a low-cost, easily maintainable, fast deployable communication system capable of broadband and network communication in various environments. Embodiments of the present invention are directed at providing such a communication system. These and other advantages of the invention, as well as additional inventive features, will be apparent from the description of the invention provided herein.

BRIEF SUMMARY OF THE INVENTION

Embodiments of the present invention overcome drawbacks of prior elevated communications systems, by using small and relatively inexpensive and lightweight microelectronics to incorporate most of the functions provided by existing communications satellites in aircraft communications platforms. More particularly, embodiments of the present invention provide a communications network utilizing an airborne or atmospheric platform as a central node in a star topology wireless communication network serving a plurality of subscribers.

In one embodiment of the invention, a system for providing wireless communication services in a geographic area using a star network topology is provided. The system includes at least one atmospheric platform serving as a central relay or node for the geographic area. The atmospheric platform carries a payload that comprises communications equipment. The system can further include a plurality of user equipment units located within the geographic area and optionally at least one fixed or mobile gateway for providing an information pathway to one or more wide area networks (e.g. the Internet, the Global Information Grid, etc.). The gateway has network processing and switching equipment for routing the information to and from the attached wide area networks. The gateway provides information pathways from the platform to user equipment units outside of the geographic area through existing communications infrastructure, such as public switched telephone network (PSTN), fiber optics, satellites or another atmospheric platform servicing different geographical areas.

Embodiments of the present invention provide robust systems that combine the benefits of providing the network switching capability in the air with the benefits of using an affordable airborne platform instead of costly satellite technology. The network of one embodiment of the present invention is particularly useful in broadband and narrowband communications markets, serving the needs of users requiring fixed, portable, and mobile communications services.

Embodiments of the present invention provide a communication system for wireless broadband communication between a plurality of users. The system includes at least one airborne vehicle for transmitting and receiving communication data within a predefined coverage area.

In one embodiment, the airborne vehicle can further include an attitude determining mechanism for generating attitude reference information and a position determining mechanism for generating position information of the airborne vehicle relative to each of the users. The airborne vehicle also includes a central processing unit for generating targeting signals according to the generated attitude reference information and position information and an assignor for assigning at least one transmit and at least one receive data channel of a predefined transmission scheme to each user. In one embodiment data channel transmission and reception occur at different time intervals according to a predefined timing protocol. The airborne vehicle further includes a receive high directivity electronically-steerable antenna for receiving data according to the generated targeting signals, a switching device for routing data from and to source and destination users and a transmit high directivity electronically-steerable antenna for transmitting the received data to the determined destination at the assigned transmit data channel according to the generated targeting signals.

In one embodiment, for low data rate communications (e.g. voice), or for situation where the communicating range is short (is less than 5 km), users can operate with substantially conventional omni-directional antennas. However, in embodiments that provide high data rate communications, especially at extended ranges, each of the users preferably has a high directivity antenna. Furthermore, when mobility of the user or mobility of the airborne basestation is important, some of the users preferably have a high directivity electronically-steerable antenna.

Each of the users optionally has an attitude determining mechanism for generating attitude reference information, a position determining mechanism for generating position information, a central processing unit for generating targeting signals according to the generated attitude reference information and position information, and transmit and receive antennas for receiving and transmitting data according to the generated targeting signals and the predefined transmission scheme.

In accordance with further embodiments of the invention, the system further includes an operations controller with a communication link for supplying operations controlling information to the airborne vehicle. In accordance with other embodiments of this invention, the airborne vehicle can be unmanned or manned.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 4a shows a schematic view of a multiple beam, electronically steerable antenna which can be utilized with the aircraft basestation system.

FIG. 4b shows an exploded side view of a monolithic integration module of FIG. 4a.

FIG. 5 shows a top view of a more specific embodiment of an electronically steerable antenna of FIG. 4a.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE EMBODIMENTS

As will be better understood from the following description, embodiments of the present invention are directed to an airborne communication system for providing broadband, multi-user communication within a network. Broadband communication provides efficient communication of voice, video and data. It should be noted that the following description will discuss various embodiments and environments in which such embodiment are preferably operated. However, such discussion is provided by way of example and not by way of limitation.

Figure 1:
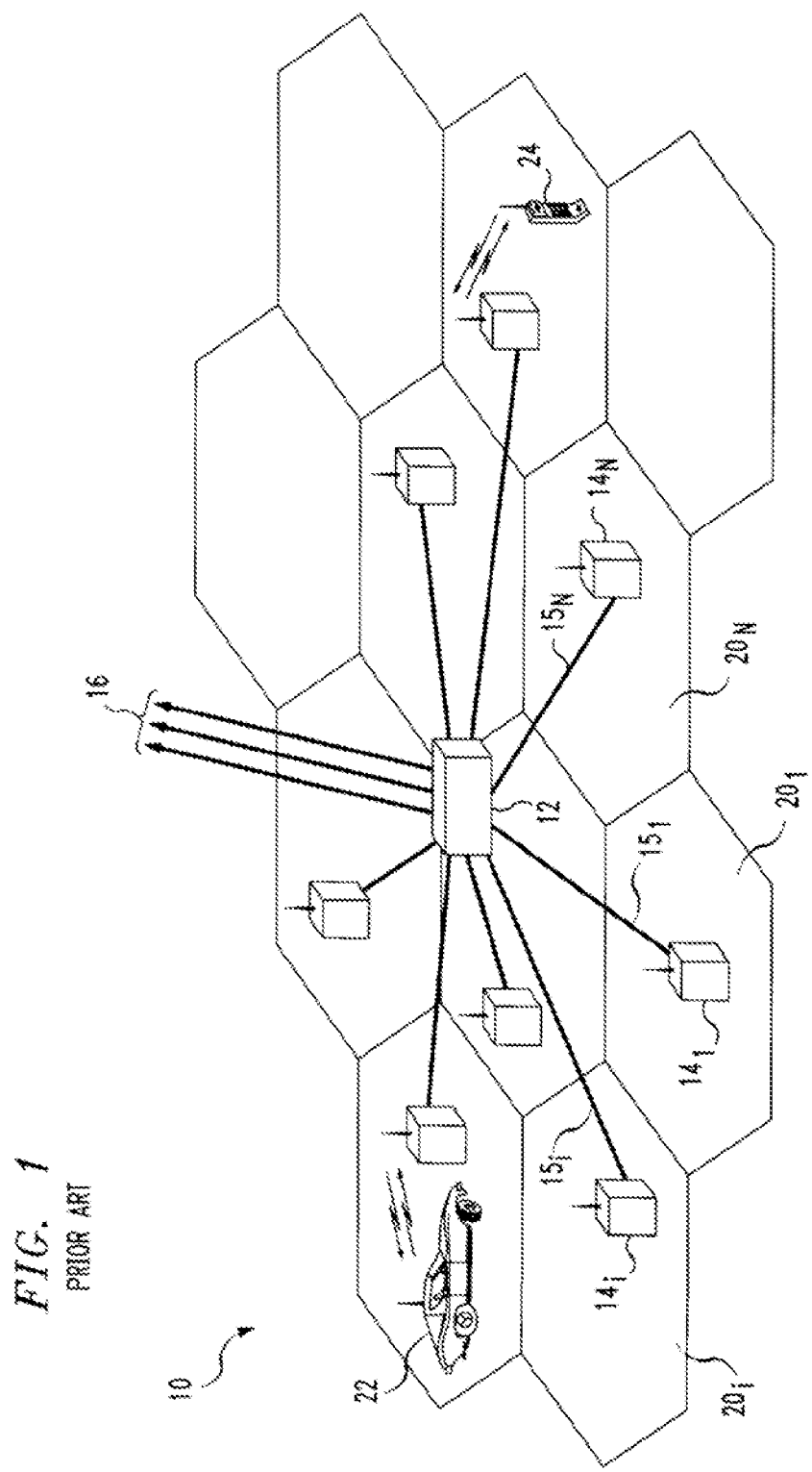
FIG. 1 depicts a schematic diagram of a portion of a typical wireless telecommunications system.
Figure 2:
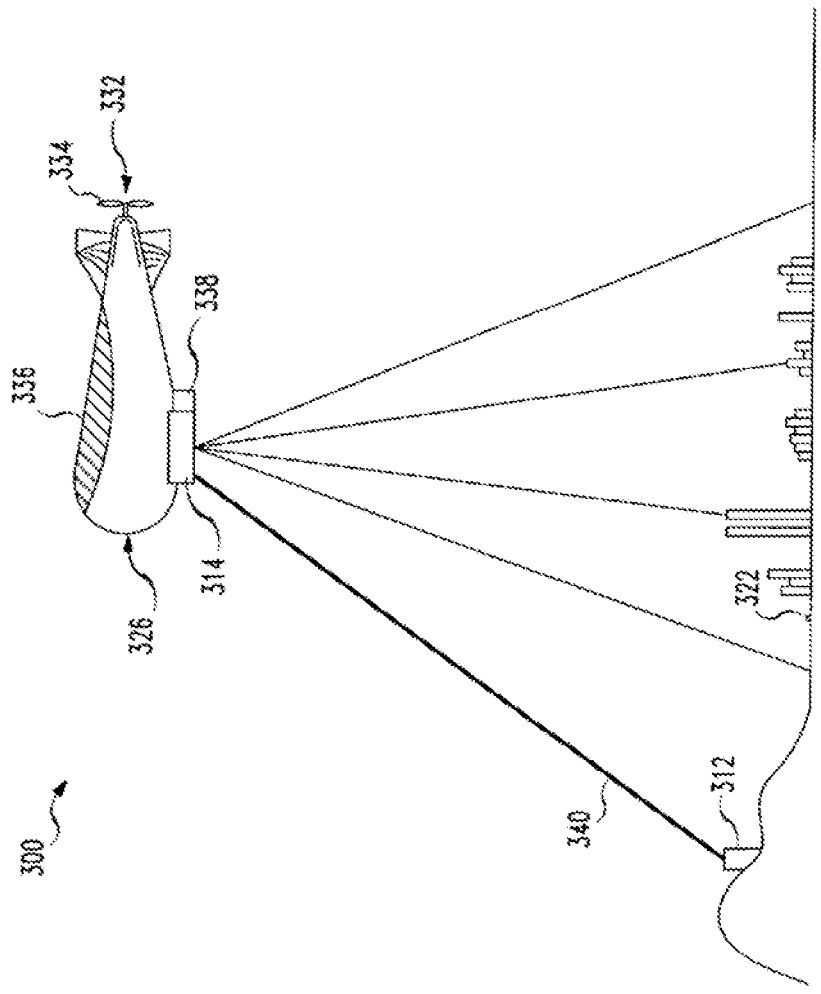
FIG. 2 illustrates the communication pathways or links between users using a known wireless telecommunications system.
Figure 3:
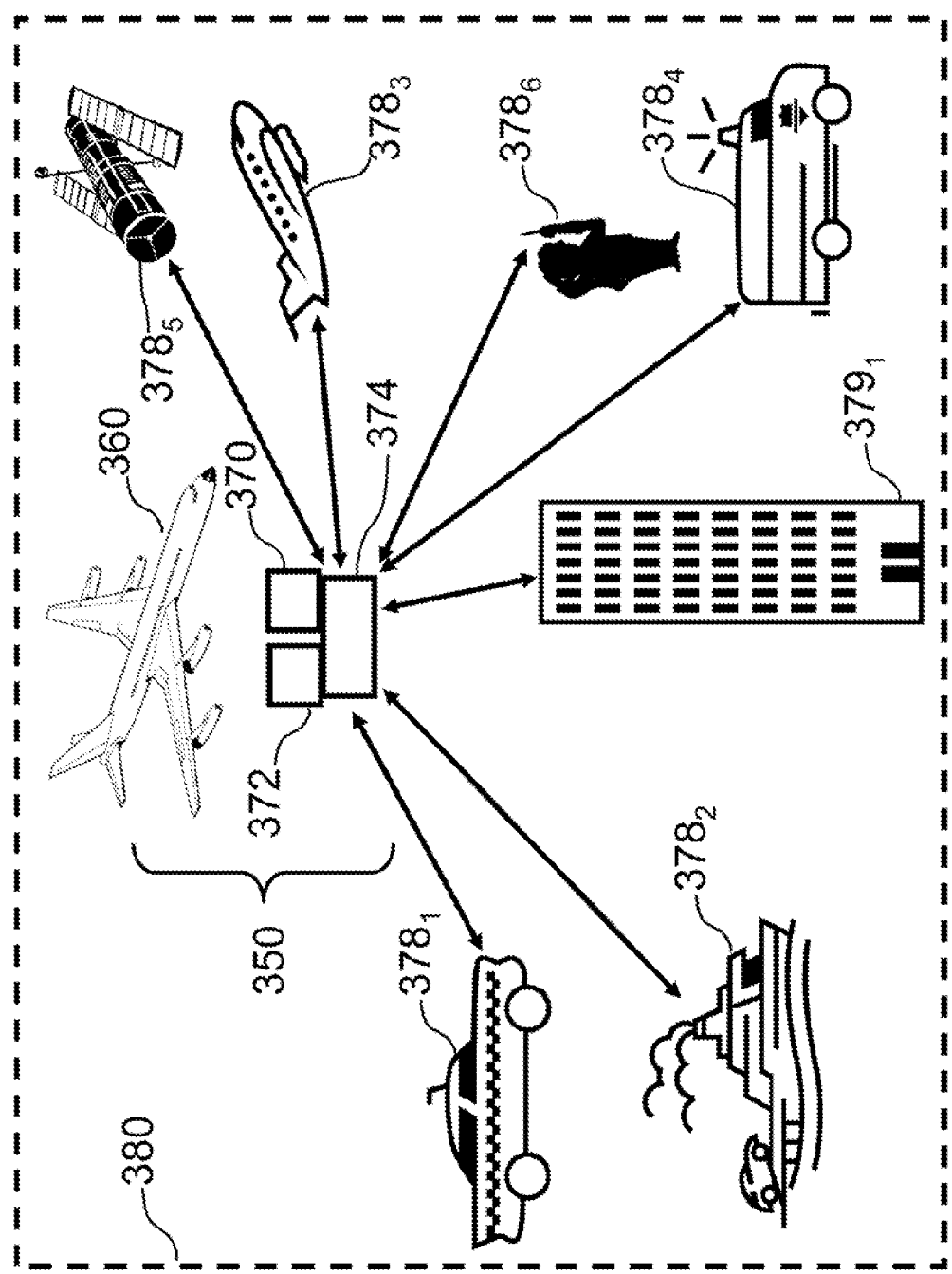
FIG. 3 is a schematic diagram illustrating various components of an embodiment of the airborne broadband communication network of the present invention.

With reference to FIG. 3, a system 350 in accordance with an embodiment of the present invention uses an aircraft 360 to provide relay broadband communication service among mobile units $378_i$ or non-mobile units $379_i$ in a coverage area or cell 380. The mobile units $378_i$ can be ground vehicles such as illustrated by car $378_1$ or ambulance $378_4$, or water vehicles as illustrated by boat $378_2$, or air vehicles as illustrated by fixed-wing airplane $378_3$, or space vehicles as illustrated by satellite $378_5$, even people, as illustrated by cell phone carrying person $378_6$, or animals. The non-mobile units $379_i$ can be buildings such as illustrated by office building $379_1$, or other fixed structures including antenna towers.

The system 350 comprises an aircraft 360, an electronically steerable phased array antenna 374, a radio 372 and a switching device for routing 370. System 350 can optionally further comprise gateway 375, which can further comprise information 382, network processing equipment 384, and switching equipment 386, such as shown in FIG. 3 of the parent application cross-referenced above.

For communications networks requiring larger coverage range (albeit at higher cost), one embodiment utilizes a higher flying aircraft. Affordable stratospheric altitude platforms (platform that ascends into the upper air stratosphere region above about 7 miles) from which surveillance and sensor equipment of various types are supported for fulfilling missions such as upper air data acquisition, weather surveillance, outer space data acquisition, communication links, ballistic missile detection and tracking and defense system device actuation, etc. have long been sought. Air breathing engine aircraft are altitude limited but can still cruise at altitudes as high as 70,000 feet as exemplified by the performance of the U-2 aircraft.

Currently available high-gain antennas are limited to either single-beam, mechanically-steered antennas (satellite dishes) not suited for highly dynamic terrestrial ad hoc networking, or unacceptably expensive phased arrays. A phased array antenna element typically costs on the order of a thousand dollars, and hundreds to thousands of elements are required for a single antenna. The resulting phased array antenna can cost millions of dollars. Furthermore, classical phased-arrays are heavy (e.g. 200 to 300 lbs. for the required apertures for a winged aircraft) and thus also undesirable for use in any aircraft.

By contrast, embodiments of the instant invention employ a high-gain electronically-steered light-weight antenna technology which may cost less than one hundred dollars per antenna. This low-cost and high functionality enables deployment on an aircraft, which enables rapidly deployable communications.

Referring again to FIG. 3, for the electronically steerable phased array antenna 374, one embodiment of the instant invention employs the novel high-gain electronically-steered light-weight antenna technology disclosed by Olsen in Steerable Antenna, U.S. patent application Ser. No. 11/603,707 filed Nov. 22, 2006 (Olsen SA), the teachings and disclosure of which are hereby incorporated in their entireties by reference thereto.

Generally speaking, Olsen SA provides an integrated phased array for simultaneously receiving/transmitting signals. The integrated phased array comprises the following elements: an array of antenna elements, a plurality of waveguides, a beam forming network, and an RF switch. More specifically the integrated phased array may comprise a monolithic integrated unit comprising a dielectric layer sandwiched between two conductive layers, wherein at least two of the array of antenna elements, plurality of waveguides, beam forming network, and RF switch are contained. Olsen SA provides a 2-dimensionally (2D) steerable phased array comprising: a 1-dimensionally electronically steerable phased array, and a means for mechanically rotating said 1-dimensionally electronically steerable phased array. Also disclosed is a 2-dimensional beam forming network. Olsen SA also details an electronically steerable antenna comprising: an array of antenna elements, a means to excite the antenna elements. The antenna is steerable by inertia-less means, is capable of scanning over at least 40 degrees, has a main beam width of less than 35 degrees, and has a mass of less than 50 kilograms (and can be made in versions with a mass of less than 1 kg).

Olsen SA also details a steerable antenna that fits within a volume defined by 60 cm×60 cm×6 cm and another embodiment has a projected area less than 30 cm×30 cm. Yet another embodiment provides a steerable antenna that is isothermal to within 10 degrees Kelvin. Still another embodiment provides a steerable antenna that is substantially a conformable surface. Olsen SA also details an electronically steerable antenna with a gain of over 10 dBi and another embodiment provides a steerable antenna with a main beam height of less than 50 degrees. Still another embodiment provides an electronically steerable antenna capable of producing at least two substantially independent main beams and another embodiment is capable of scanning over at least 60 degrees. Olsen SA also details an electronically steerable antenna that consumes less than 30 Watts and another embodiment provides a steerable antenna that is self-capable of removing any heat generated from within.

Referring again to FIG. 3, for the radio 372, an embodiment of the airborne basestation of the present invention uses any reasonably lightweight and power efficient radio in any microwave or millimeter wave frequency band. For example the radio 372 in one embodiment comprises a commercially off the shelf IEEE 802.11 compliant radio, or an 802.16 compliant radio. For another embodiment the radio 372 comprises a JTRS (Joint Tactical Radio System) compliant radio if the JTRS radio's weight and cost are appropriate for the intended application.

In one embodiment of the present invention, a router that can be used for the switching device for routing 370 is provided by a Cisco Model 2600 Series router available from Cisco Systems, Inc., San Jose, Calif., USA. The Cisco 2600 Series of modular multi-service access routers offer flexible LAN (local area network) and WAN (wide area network) configurations, integrated security features, and a range of high performance processors. In an alternate embodiment, a router that can be used for the switching device for routing 370 for low cost applications is provided by Linksys Model INSTANT BROADBAND™ router from Linksys, Irvine Calif., USA. The Linksys Model INSTANT BROADBAND™ router is inexpensive, has a 4-Port Switch/VPN Endpoint, and is suitable for connecting a small group of PCs to a high-speed broadband gateway (e.g. Internet) connection or a 10/100 Ethernet backbone.

Embodiments of the present invention overcome an important limitation, namely latency, of satellite-based systems. Communications satellites are typically deployed in GEO orbits, which place them at a distance of 35,788 kilometers (km) above the Earth's surface. Although electromagnetic signals travel at the speed of light, these signals must be uplinked from the ground station, be processed by the satellite, and be downlinked to another ground station and/or a user antenna. Since the distance between original transmission and final destination is 35,788 km times two (equals 71,576 km), a significant delay in the system transit time is introduced (about 240 milliseconds). Such delays are especially noticeable in duplex communications systems. Further, satellite data throughput capabilities can be strained as more and more data are required in a given geographic region.

Embodiments of the present invention minimize the delay in the system by providing a shorter total communication path distance between the communicating entities (e.g. the users and the data sources). Embodiments of the present invention also reduce the projected beam size on the ground, thus increasing "bandwidth/ground area." The present invention uses a "Geo-stationary" aeronautical platform that is suitable for microwave and other payloads similar to those used in satellite communications systems. Since the distance between the ground station and the platform is around twenty km, the delay between transmission and reception is reduced to less than 0.06% of that of a geosynchronous satellite transmission system (~0.1 millisecond round-trip delay). In other words, the latency of the present approach is more than 1,000 times better than for GEO satellites. Furthermore since the area of a 20 km radius circle is about 1300 square kilometers compared with $\frac{1}{3}^{rd}$ of the earth's area (170 million square kilometers, the area covered by a geostationary satellite), embodiments of the present invention can exhibit a 100,000 times greater bandwidth/ground area utility than GEO satellites.

Returning again to FIG. 3, basestation 360, together with nodes 378$i$, within cell 380 clearly form a communications system. In one embodiment basestation 360 serves as a central relay or node for cell 380 for a geographic area. In another embodiment basestation 360 comprises a gateway 375 to at least one wide area network. The gateway 375 further comprises: the information 382, network processing equipment 384 and switching equipment 386 wherein the switching equipment 386 routes the information 382 to and from the gateway 375 to at least one wide area network. Examples of a wide area network include a public switched telephone network (PSTN), a fiber optics network, a satellite network, or another atmospheric platform servicing different geographical areas.

FIG. 4a is a schematic view of a multiple beam array antenna system which could be utilized with the present invention. A beam forming network 620 with multiple inputs 621 and multiple outputs 622 is fed at least one RF signal by a means for selectively connecting 610 to at least one of the multiple inputs 621. The beam forming network 620 operates on an input RF signal applied to one of its inputs 621 to produce multiple time delayed (or phase shifted) copies with a variety of amplitudes which are modified relative to the input RF signal. An array of antenna elements 630 is connected to the multiple outputs 622. The beam forming network 620 can, in general perform steering in two dimensions, e.g. both elevation and azimuth angles. However, costs, size and height can be minimized when the beam forming network 620 operates in a single dimension.

FIG. 4b is an exploded side view of a monolithic integration module 660. The monolithic integration module 660 comprises a dielectric layer 665 sandwiched between an upper conductive layer 666 and a bottom conductive layer 667. To provide an integrated unit, with subsequent cost, simplicity, height and volume benefits, at least two among the beam forming network 620, means for selectively connecting 610, multiple inputs 621, multiple outputs 622, and array of antenna elements 630 are contained within the monolithic integration module 660.

The term RF signal as used here means an electromagnetic signal in microwave or millimeter wave bands. Means for selectively connecting 610 can be discreet or continuous in nature. An example of discreet means is one or more switches, either electrically operated or mechanically operated. An example of an electrically operated switch is a circuit based on a PIN diode. An example of continuous means for selectively connecting 610 is a feed horn which can be slid along the surface of a lens (which is itself an example of a beam forming network).

Figure 5:
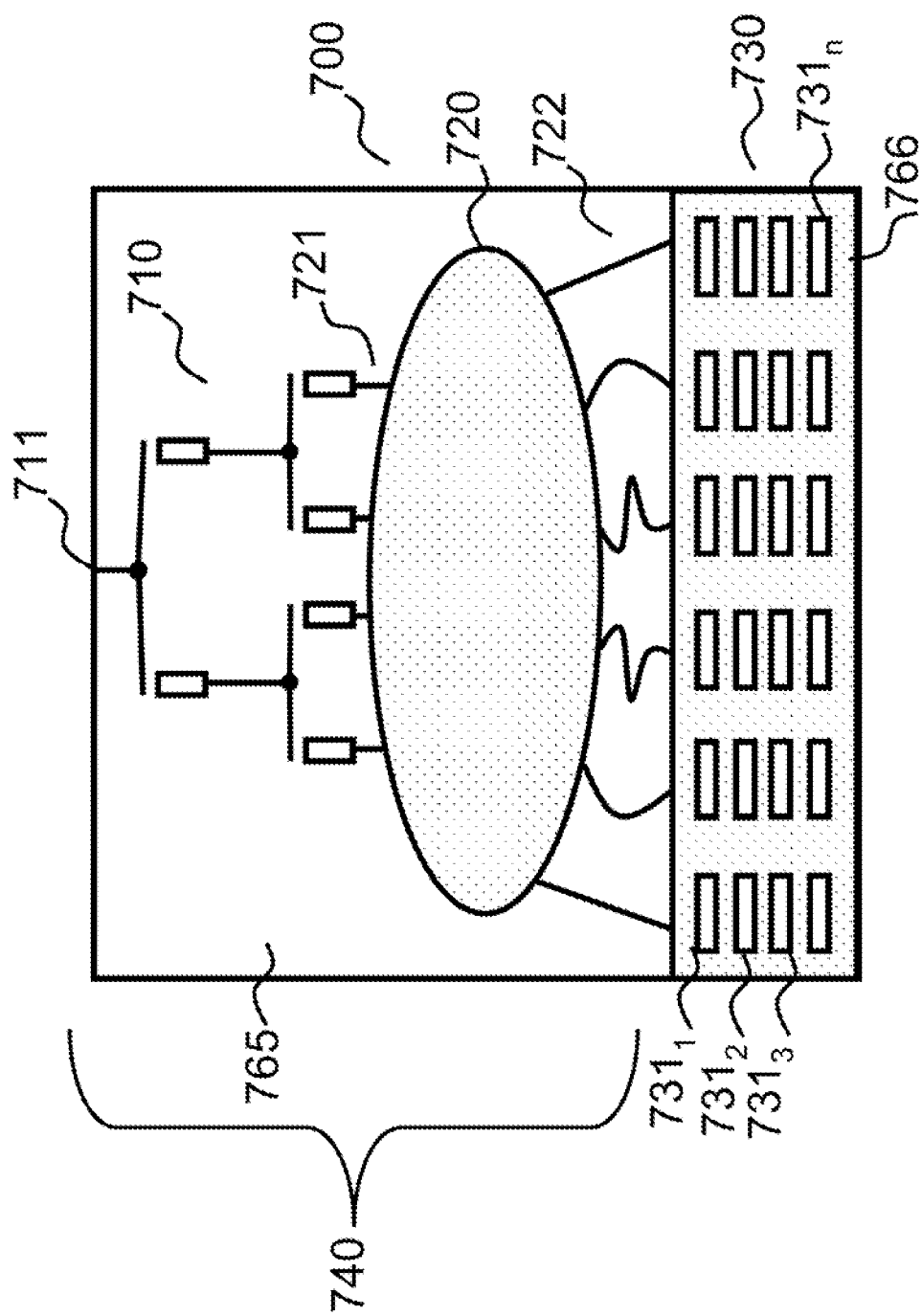

FIG. 5 is a top view of a more specific first embodiment of this invention. Rotman lens 720 is an example of a beam forming network. It is fed by switch network 710, an example of a means for selectively connecting. In this illustration, switch network 710 is a corporate or binary switch tree starting from a single input 711 which can be selectively connected to any Rotman lens input 721 by appropriately setting the individual switches of switch network 710. Rotman lens 720 performs its beam forming operation on an RF signal sent from single input 711 through one of Rotman lens inputs 721 then delivers phase-shifted signals through Rotman lens outputs 722 to antenna elements 730.

In this case, antenna elements 730 are provided by slots 731-1 through 731-N, etched in top conductor 766. Bottom conductor 767 (which is not visible from this orientation) is substantially a solid featureless conductive sheet. In this example, both top conductor 766 and bottom conductor 767 are copper. However, other electrical conductors can be used, including without limitation aluminum, other metals, painted, inked or vapor deposited conductors, or even polymeric conductors. In addition, in this example, glass-loaded teflon sheet 765 is used as an example of a dielectric layer.

Starting stock for this metal-surrounding-dielectric construction for use at, for example, 5.8 GHz can be obtained commercially as 0.050 inch thick Duroid 5880 from Rogers Corporation located in Rogers, Conn., USA. With the exception of the electrically activated switches, all of the features illustrated in FIG. 5 can be produced by electrochemically etching the top conductor 766 by processes common in the circuit board fabrication art. The switches of switch network 710 can be provided by PIN-diode based circuits as commonly practiced in microwave and millimeter wave art. An exciter 740, a specific example of a means to excite, comprising the elements shown in the upper portion of FIG. 7 provides signal to the antenna elements 730. Herein generally, a means to excite the antenna elements shall be defined as comprising the beamforming network plus the means of selective connection and any needed connection between the beamforming network, the means of selective connection and the antenna elements.

In this example, all three subsystems, beamforming network, antenna elements, and means of selective connection are shown to be incorporated onto a single monolithic integrated unit. The values of this integration stem from the fact that cost, complexity, weight, and size are all reduced, thus enhancing practicality. It is clear that other configurations are possible wherein only two of the three subsystems are incorporated onto a single monolithic integrated unit, yet significant cost and other benefits can still be achieved.

With certain additional considerations, the invention taught by FIGS. 4 and 5 can be realized in lightweight form. The most significant way to reduce the mass of the invention is to utilize a low density foam dielectric for dielectric layer 665. An example of such foam can be obtained from Arlon Materials for Electronics Co., Ltd. Jiangsu, China in Model FoamClad RIF 100.

An additional approach for low mass is to use a TEM mode-only structure, as the thickness of such a structure will necessarily be below $\lambda/2$ (half the wave length in the dielectric material) (see for example Microwave Engineering, 2"d Edition, David Pozar, published by John Wiley and Sons, N.Y., pages 115-119) the resulting system will necessarily be limited in mass. This invention therefore also provides a mechanically thin phased array (wherein the array thickness is less one tenth the longest linear dimension of its aperture area). An additional strategy to reduce mass is to use only a thin layer of conductor. Specifically, one can use less than 10 skin depths of a conductor without increasing the electrical losses within the structure. Moreover, one can reduce the thickness down to below 3 skin depths with only sn~aliln creases in electrical losses and thus achieve low conductor mass. When such thin layers employed it may be advisable to provide a protective overcoat to prevent oxidation of the conductor lest the long term performance suffer degradation.

Of course, it is understood that the above listed approaches to achieving low mass can be used in combinations as well as alone.

When one employs a TEM-mode (transverse electric and magnetic mode) structure in the instant invention, a very important benefit is the production of a dimensionally tolerant product. This dimensional tolerance enables a low production cost quite distinct from expensive conventional microwave waveguide hardware.

Further details of high-gain, electronically-steered lightweight antenna technology are described in the above Olsen SA patent application.

For low data rate communications (e.g. voice) or for situations where the communicating range is short, an embodiment of the present invention further includes mobile subscriber nodes. Preferably, these mobile subscriber nodes comprise a substantially conventional omni-directional antenna. For high data rate communications especially at extended ranges, an embodiment of the present invention further comprises mobile subscriber nodes having a high directivity antenna. More specifically, in one embodiment the high directivity antenna comprises an electronically-steerable antenna.

Thus there has been described embodiments of a network system, apparatus and method that provides wireless communications, such as voice, data, images, video, and multi-media services, to a geographic area large enough to encompass a city and its neighboring communities. The network can provide broadband and narrowband data services to subscribers by utilizing signal bandwidths at either microwave or millimeter wave (MMW) carrier frequencies for providing wireless subscriber links. It should be understood that the above-described embodiments are merely illustrative of the some of the many specific embodiments that represent the principles of the present invention. For example, a time division multiple access (TDMA) system (which is known in the art) could be utilized with the present invention to provide a digital communication channel allowing multiple users to access a single communication channel. Clearly, numerous other arrangements can be readily devised by those skilled in the art without departing from the scope of the present invention.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It will be understood that many additional changes in the details, materials, steps and arrangement of parts, which have been herein described and illustrated to explain the nature of the invention, may be made by those skilled in the art within the principal and scope of the invention as expressed in the appended claims.

What is claimed is:

1. A communication system for a geographic area, comprising:
    an airborne wireless communications base station for use with an aircraft having a single monolithic integrated unit, including a two-dimensional beam forming network connected to an electronically steerable antenna, wherein the two dimensional beam forming network with multiple inputs and multiple outputs is fed at least one RF signal by a means for selectively connecting to at least one of the multiple inputs to produce multiple time delayed copies with a variety of amplitudes relative to the at least one RF signal, and an array of antenna element is connected to the multiple outputs, a radio electrically connected to the antenna, a switching device for routing electrically connected to said radio, wherein the aircraft providing mechanical support for the antenna; the radio and the switching device for routing;
    a plurality of user equipment units located in the geographic area in communication with the airborne wireless communications base station.

2. The system of claim 1 wherein the aircraft comprises:
    an altitude determining mechanism for generating altitude reference information;
    and a position determining mechanism for generating position information of the aircraft relative to each of the users.

3. The system of claim 2 comprising:
    a central processing unit for generating targeting signals according to the generated altitude reference information and position information for communications; and
    an assignor for assigning at least one transmit and at least one receive data channel of a predefined transmission scheme to each user.

4. The system of claim 3 wherein data channel transmission and reception occur at different time intervals according to a predefined timing protocol.

5. The system of claim 4 wherein the airborne vehicle further comprises;
    a receive high directivity electronically-steerable antenna for receiving data according to the generated targeting signals,
    a switching device for routing data from and to source and destination users;
    and a transmit high directivity electronically-steerable antenna for transmitting the received data to the determined destination at the assigned transmit data channel according to the generated targeting signals.

6. The communications system of claim 5, further comprising a wide area network, and wherein the wireless communications basestation further comprises a gateway operatively coupled to the switching device for routing to provide connectivity to the wide area network.

7. The communications system of claim 6, wherein the wide area network is selected from the group consisting of a telephone network (PSTN), a fiber optics network, or a satellites network.

8. The communications system of claim 6, wherein the wide area network comprises a second airborne wireless communications basestation deployed to service a second geographic area.

9. The communications system of claim 6, wherein at least one of the user equipment units comprise an omni-directional antenna for low data rate communications.

10. The communications system of claim 9, wherein at least one of the user equipment units comprise a high directivity antenna, electronically-steerable antenna.

11. An airborne wireless communications base station for use with an aircraft, comprising:
    a single monolithic integrated unit having a two dimensional beam forming network connected to an electronically-steerable antenna, wherein the two dimensional beam forming network with multiple inputs and multiple outputs is fed at least one RF signal by a means for selectively connecting to at least one of the multiple inputs to produce multiple time delayed copies with a variety of amplitudes relative to the at least one RF signal, and an array of antenna element is connected to the multiple outputs;
    a radio electrically connected to the antenna;
    a switching device for routing electrically connected to said radio; and
    the aircraft providing mechanical support for the antenna; the radio and the switching device for routing;
    wherein the aircraft comprises
    an altitude determining mechanism for generating altitude reference information;
    a position determining mechanism for generating position information of the aircraft relative to each of the users;
    a central processing unit for generating targeting signals according to the generated altitude reference information and position information for communications; and
    an assignor for assigning at least one transmit and at least one receive data channel of a predefined transmission scheme to each user.

12. The wireless communications basestation of claim 11 wherein the radio processes at least one of broadband communications and narrowband communications.

13. The wireless communications basestation of claim 11, further comprising a gateway operatively coupled to the switching device for routing to provide connectivity to at least one wide area network.

14. The wireless communications basestation of claim 11, wherein the antenna has a mass of less than approximately 6 kg.

15. The wireless communications basestation of claim 11, wherein the antenna has a mass of less than approximately 2 kg.

16. The wireless communications basestation of claim 11 wherein the aircraft is a balloon.

17. The wireless communications basestation of claim 16, further comprising a tether coupled to the balloon.

18. The wireless communications basestation of claim 16, wherein the balloon is selected from a group consisting of a rubber pressure balloon, a zero pressure balloon, an internal air bladder balloon, an adjustable volume balloon, or a super pressure balloon.

19. The wireless communications basestation of claim 11, wherein the aircraft comprises a stratospheric altitude platform.

20. The wireless communications basestation of claim 19, wherein the stratospheric altitude platform comprises a free balloon.

\* \* \* \* \*